(12) United States Patent
Gupta et al.

(10) Patent No.: US 8,386,741 B2
(45) Date of Patent: Feb. 26, 2013

(54) METHOD AND APPARATUS FOR OPTIMIZING DATA ALLOCATION

(75) Inventors: Karan Gupta, San Jose, CA (US);
Reshu Jain, San Jose, CA (US);
Prashant Pandey, San Jose, CA (US);
Himabindu Pucha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/871,970

(22) Filed: Aug. 31, 2010

(65) Prior Publication Data
US 2012/0054429 A1    Mar. 1, 2012

(51) Int. Cl.
| G06F 12/00 | (2006.01) |
| G06F 17/30 | (2006.01) |
| G06F 13/00 | (2006.01) |
| G06F 13/28 | (2006.01) |

(52) U.S. Cl. ........................... 711/170; 707/822
(58) Field of Classification Search .................. 711/170
See application file for complete search history.

(56) References Cited

U.S. PATENT DOCUMENTS

| 5,651,133 A * | 7/1997 | Burkes et al. ................. 711/114 |
| 6,941,420 B2 | 9/2005 | Butterworth et al. |
| 7,143,259 B2 | 11/2006 | Dalal et al. |
| 7,143,260 B2 | 11/2006 | Dalal et al. |
| 7,159,093 B2 | 1/2007 | Dalal et al. |
| 7,383,410 B2 | 6/2008 | Dalal et al. |
| 7,617,370 B2 * | 11/2009 | Jernigan et al. ............... 711/165 |
| 2004/0107314 A1 | 6/2004 | Kim et al. |
| 2006/0155831 A1 | 7/2006 | Chandrasekaran |
| 2006/0248273 A1 | 11/2006 | Jernigan et al. |
| 2007/0174333 A1 | 7/2007 | Lee et al. |
| 2008/0195675 A1 * | 8/2008 | Torrent et al. ................. 707/204 |
| 2009/0210431 A1 * | 8/2009 | Marinkovic et al. ........... 707/10 |

OTHER PUBLICATIONS

Ananthanarayanan, Gupta, Pandey, Pucha, Sarkar, Shah, Tewari, "Cloud analytics: Do we really need to reinvent the storage stack?" IBM Research. HotCloud '09, Workshop on Hot Topics in Cloud Computing. Jun. 2009.*

* cited by examiner

*Primary Examiner* — Yaima Campos
*Assistant Examiner* — Rocio del Mar Perez-Velez
(74) *Attorney, Agent, or Firm* — Lieberman & Brandsdorfer, LLC

(57) ABSTRACT

Embodiments of the invention relate to block layout and block allocation in a file system to support write transactions. Regions in a cluster file system are defined to support a block allocation, include both write affinity and wide striping region. An allocation map is maintained to define and support the block allocation regions. For each write transaction, a copy of data is written to both regions, and in the event there is a shortage of blocks in one of the regions, at least one block in the other region is dynamically converted to support the write transaction.

18 Claims, 6 Drawing Sheets

METHOD AND APPARATUS FOR OPTIMIZING DATA ALLOCATION

BACKGROUND

This invention relates to data storage in a computer system environment. More specifically, the invention relates to block layout and block allocation in a file system to support write transactions.

A data storage block or a storage block, herein after referred to as a block, refers to specific areas of address space on a storage device. For example, one data block may be a collection of sectors or bytes in an area of disk space. Blocks are manipulated as units. Large block allocations allow a large amount of data to be retrieved in a single I/O transaction. In one embodiment, a block is a fixed-size unit of data that is transferred together. A file system is a collection of file data maintained by an implementation that store, organize, and maintain file data in a file and/or directory hierarchy. File systems employ techniques to write data to storage media using block allocation techniques. Typically, a storage system provides access to information that is stored on one or more storage devices connected to the storage system. Access to the information is possible by organizing the storage devices into volumes, which logically organize the information stored on the storage devices.

The storage system may be further configured to operate according to a client/server model of information delivery to thereby allow many clients to access data containers stored on the system. In this model, the client may employ an application, such as a database application, executing on a computer that connects to the storage system over a computer network. Each client may request the services of the storage system by issuing file-based protocol messages to the system over the network. A plurality of storage systems may be interconnected to provide a storage system environment configured to service many clients. Each storage system may be configured to service one or more volumes, wherein each volume stores one or more data containers.

BRIEF SUMMARY

This invention comprises a method, system, and article for allocating storage blocks in a file system to support a write transaction consisting of different policies, and for performing the allocation in an efficient and scalable manner.

In one aspect of the invention, a method is provided for allocating storage blocks to support a write transaction consisting of two different policies, wide striping and write affinity. Two types of regions are defined in a cluster file system for a block allocation. One of the two regions is a write affinity region, and the other one of the two regions is a wide striping region. The write affinity region includes blocks from data storage that are local to a node in the cluster. Conversely, the wide striping region includes blocks from all data storage in the cluster. An allocation map is maintained for all data storage space in the cluster. The allocation map provides two views of the storage space. One view shows the storage space divided into wide striped regions, and a second view shows the storage space divided into write affinity regions. For allocating storage blocks for each write transaction, a writer node acquires ownership of at least one write affinity region and at least one wide striping region. A first copy of data is written to a free block in the acquired write affinity region, and a second copy of data is written to a free block in the acquired wide striping region. At such time as all of the regions of one of the defined types are running out of available blocks to support a write transaction, at least one block in one of the defined types is dynamically converted to the other defined type.

In another aspect of the invention, a computer system is provided with a cluster file system having two types of defined regions for block allocations. One of the region types is a write affinity region, and one of the region types is a wide striping region. The write affinity region includes blocks from data storage local to a node in the cluster. Similarly, the wide striping region includes blocks from all of the data storage in the cluster. An allocation map is provided for all of the storage space in the cluster. More specifically, the allocation map includes two views of the storage space. One view shows the storage space divided into wide striped regions, and another view shows the storage space divided into write affinity regions. A write manager is provided to allocate storage blocks to support a write transaction. The write manager writes a first copy of data for a write transaction to a free block from the write affinity region. The write manager also writes a second copy of the data to a free block in the wide striping region. An allocation manager is provided in communication with the write manager. The allocation manager functions to dynamically convert one or more blocks in one of the defined regions to the other defined region in order to support the write transaction at such time as all of the regions of one of the defined types are running out of available blocks to support a write transaction.

In yet another aspect of the invention, a computer program product is provided with a computer readable storage medium having embodied computer readable program code. More specifically, computer readable program code is provided to define two or more region types in the file system to support a block allocation. One of the region types is a write affinity region, which has blocks from data storage local to a node in the cluster. Another of the region types is a wide striping region, which has blocks from all data storage in the cluster. Computer readable program code is provided to maintain an allocation map for all data storage in the cluster. The allocation map has two views of the data storage, including a view showing the storage space divided into wide striped regions and a view showing the storage space divided into write affinity regions. For each write transaction, computer readable program code is provided to allocate storage blocks include code to write a first copy of data to a free block from the write affinity region and a second copy of the data to a free block from the wide striping region. Computer readable program code is also provided to dynamically convert one or more blocks in the defined storage regions to support the write transaction in response to all of the regions of one of the defined types running out of available blocks.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
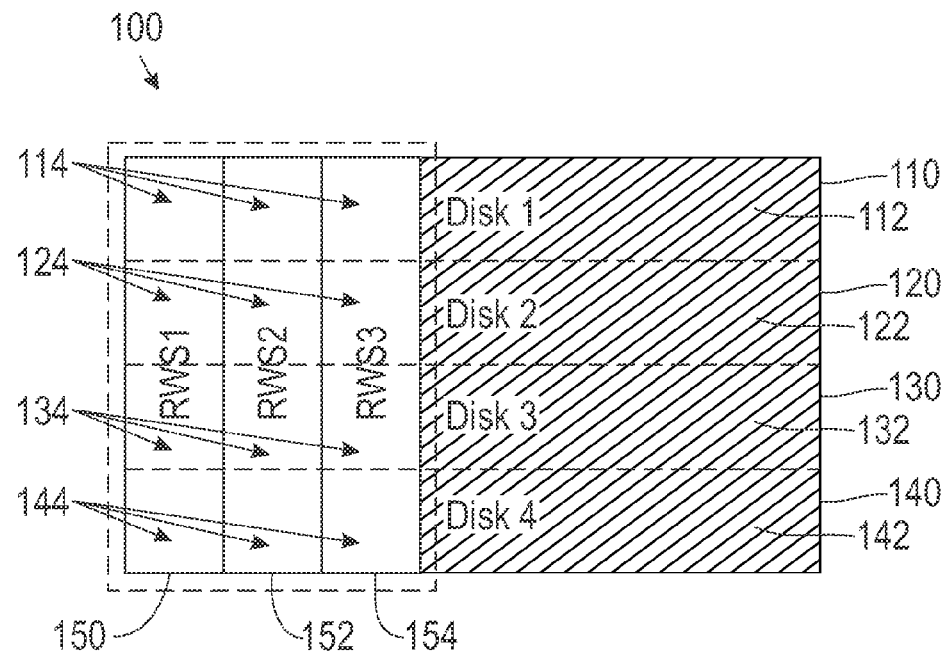
FIG. 1 is a block diagram of a logical view of a block allocation map for wide striping.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and clients. A manager and/or client may be implemented in programmable hardware devices such as field programmable gate arrays, programmable array logic, programmable logic devices, or the like. The manager and/or client may also be implemented in software for processing by various types of processors. An identified manager and/or client of executable code may, for instance, comprise one or more physical or logical blocks of computer instructions which may, for instance, be organized as an object, procedure, function, or other construct. Nevertheless, the executables of an identified manager and/or client need not be physically located together, but may comprise disparate instructions stored in different locations which, when joined logically together, comprise the manager and/or client and achieve the stated purpose of the manager and/or client.

Indeed, a manager and/or client of executable code could be a single instruction, or many instructions, and may even be distributed over several different code segments, among different applications, and across several memory devices. Similarly, operational data may be identified and illustrated herein within the manager and/or client, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a write stream manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cluster file system is an enterprise storage file system which can be concurrently accessed for reading and writing by multiple computers. More specifically, in such file systems the computers are in the form of cluster servers which connect to an underlying storage device. There are different architectural approaches to a shared disk file system, including distribution of file information across all the servers in the cluster to provide a consistent file system image across the cluster servers. Each storage device in the storage file system has a plurality of blocks; each block is a fixed size unit of data on a storage device. Data is written to storage in groupings of blocks, and is similarly read from storage in groupings of blocks. In one embodiment, file systems address data in blocks which contain a certain number of disk sectors; the smallest amount of disk space that can be allocated for reading and writing.

Two types of block regions are defined in the file system, a write affinity region and a wide striping region. The write affinity region has blocks from data storage local to a server in the cluster. The wide striping region has blocks from all data storage across the cluster. In other words, the write affinity region is limited to blocks that are local to a server node, and the wide striping region includes blocks that are distributed across the storage devices of the cluster, including at least one storage device local to the server node. Writing data to a write affinity region is desirable when it is necessary to reduce network traffic and as such improve the write performance. At the same time, wide striping allows all nodes and disk resources in the cluster to be used uniformly.

Figure 2:
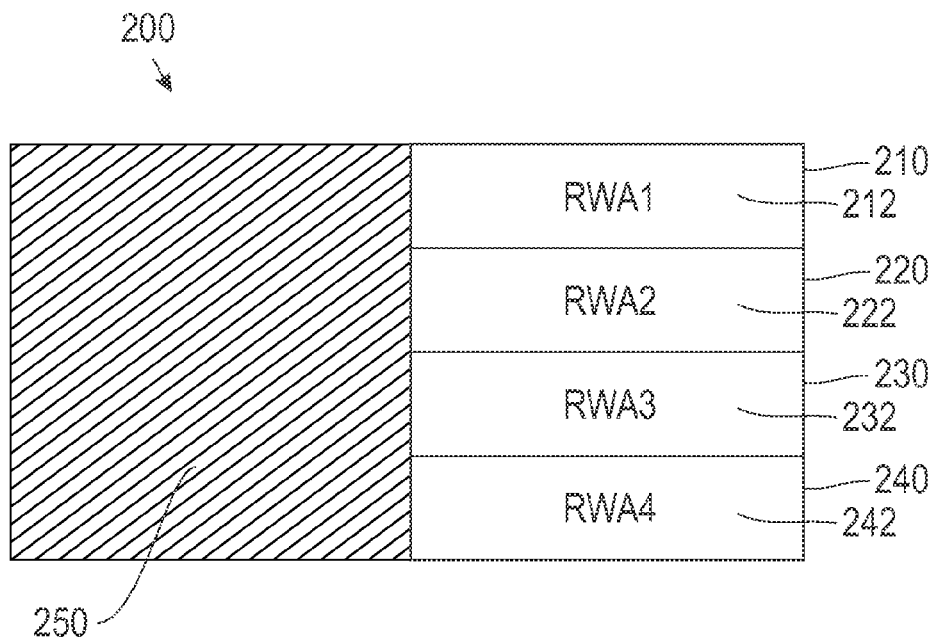
FIG. 2 is a block diagram of a logical view of a block allocation map for write affinity.

FIG. 1 is a block diagram (100) of a block allocation map for wide striping. As shown herein, there are four forms of data storage (110), (120), (130), and (140). Each data storage owns blocks, with the hashed lines (112), (122), (132), and (142) showing blocks that are not available as they are allocated for write affinity transactions, and the empty blocks (114), (124), (134), and (144) in wide striping regions (150), (152), and (154) that are available for a wide striping transaction. FIG. 2 is a block diagram (200) of a block allocation map for write affinity. As shown herein, there are four forms of data storage (210), (220), (230), and (240). Each data storage owns blocks, with hashed lines (250) showing blocks that are not available as they are allocated for wide striping transactions, and the empty blocks (212), (222), (232), and (242) show regions that are available for a write affinity transaction. Although the allocation maps (100) and (200) show four forms of data storage, the invention should not be limited to the quantity of storage elements shown herein. In one embodiment, there may be additional or a reduced quantity of storage elements provided.

Figure 3:
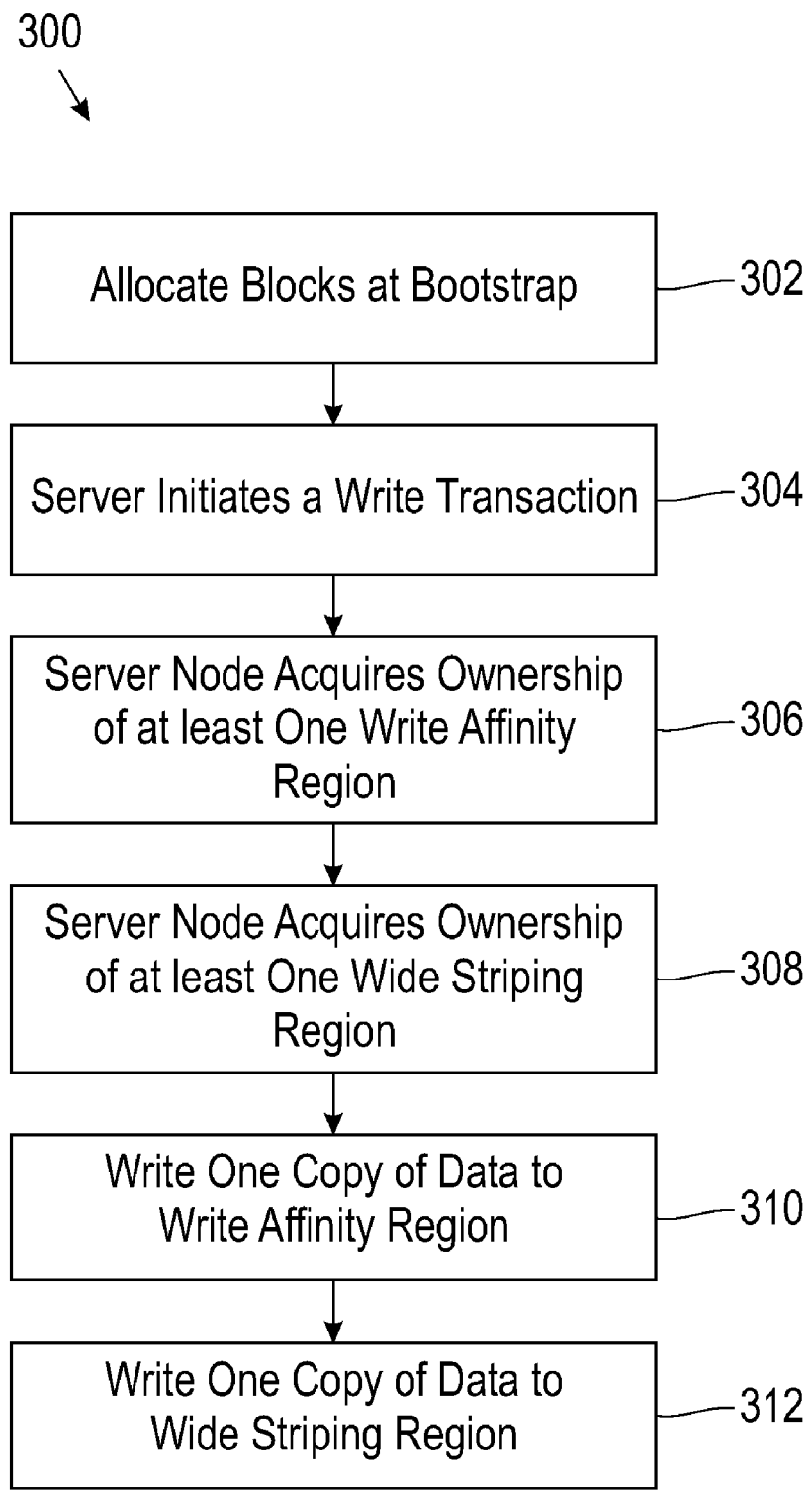
FIG. 3 is a flow chart illustrating the general process for allocating blocks of data in a clustered file system to support a write transaction.

FIG. 3 is a flow chart (300) illustrating the general process for allocating blocks of data in a clustered file system to support a write transaction. At bootstrap, blocks are allocated across the file system (302). More specifically, at bootstrap all of the blocks in the file system are divided into several regions. Some regions are of the write affinity type and some regions are of the wide striping type. The write affinity region is assigned available blocks from data storage local to a server node in the cluster; the wide striping region is assigned available blocks from all data storage in the cluster.

At such time as any one of the server nodes wants to perform a write transaction (304), the server node will acquire ownership of at least one write affinity region that has blocks for disks local to that node (306). In addition, the server node will acquire ownership of at least one wide striping region and allocate blocks from that region (308). Following step (308), the server node writes one copy of data to the acquired write affinity region (310) and writes one copy of data to the acquired wide striping region (312). For the write affinity transaction, there is no metadata transaction on an inter-node basis as the write transaction is local to the server node. For the wide striping transaction there may or may not be an inter-node metadata transaction as the write transaction may be local and/or remote from the server node. A duplicate copy of the write transaction is retained in storage, with n−1 of the copies sent over the network to support wide striping, where n is the number of copies replicated. Furthermore, and as demonstrated above, the server node initiating the write transaction acquires ownership of both a write affinity region and a wide striping region. The server node then performs the write transaction independent of other server nodes in the system, since the server node has acquired ownership of its own set of blocks for the write transaction. Accordingly, the block allocation technique demonstrated herein saves communication overhead by mitigating network traffic and provides scalability to the system for other write transactions.

Figure 4:
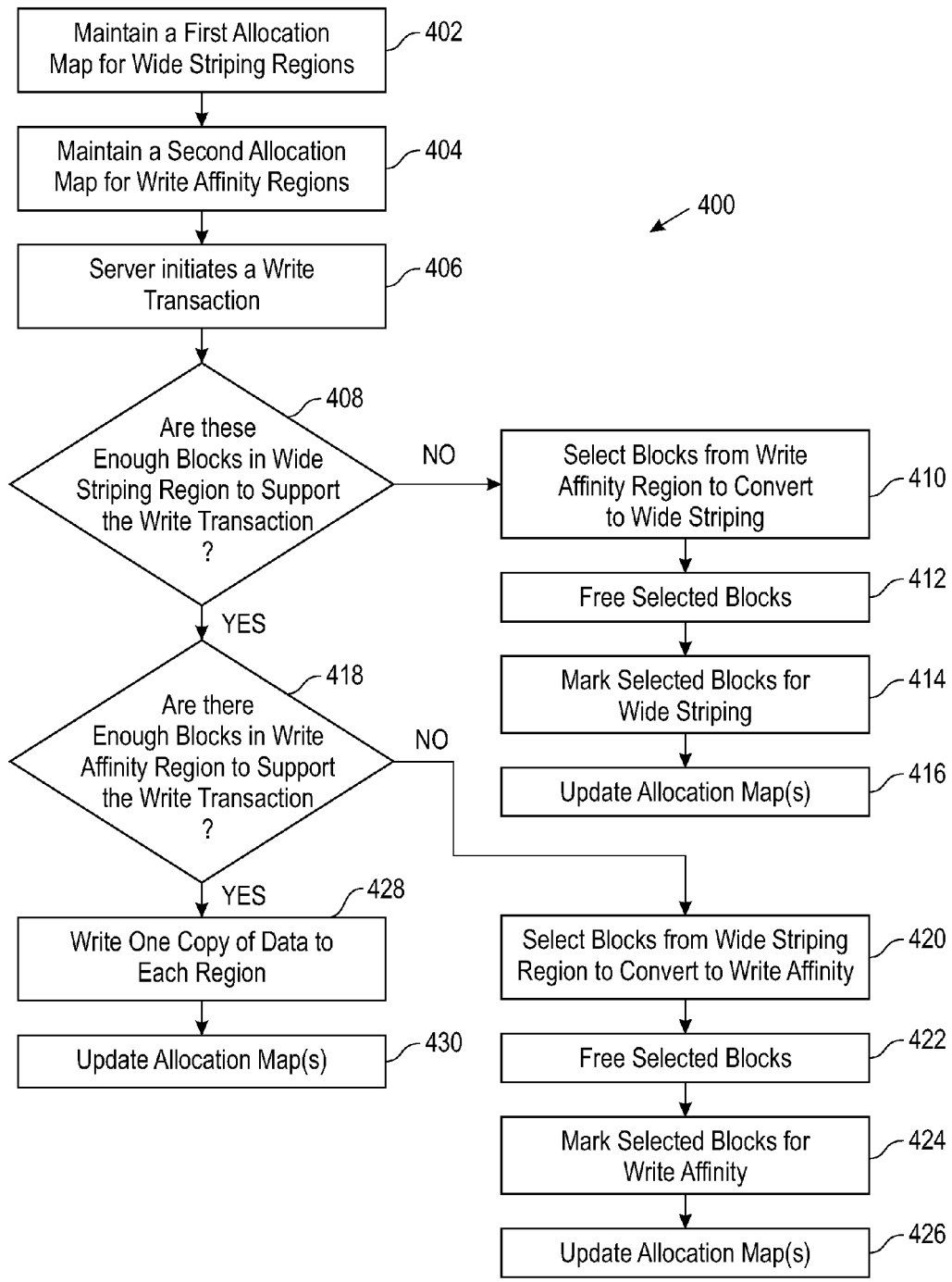
FIG. 4 is a flow chart illustrating a process for converting blocks between two defined regions.

As shown in FIG. 3, blocks to support write transactions are allocated at boot. However, a technique is employed to adapt the availability of blocks to support an allocation request by converting regions from one type to another. More specifically, blocks designated at boot for write affinity may be converted to wide striping, and blocks designated at boot for wide striping may be converted to write affinity. FIG. 4 is a flow chart (400) illustrating a process for converting blocks between the two defined regions. A first allocation map is maintained for the wide striping regions for all of the disk space in the file system (402). In addition, a second allocation map is maintained for write affinity regions for all of the disk space in the file system (404). Although two allocation maps are maintained, in one embodiment, the two allocation maps may be combined into a single allocation map having two logical views of the storage space. More specifically, in the combined map one logical view shows the storage space divided into wide striped regions and a second logical view shows the storage space divided into write affinity regions.

To support a write transaction, one or more blocks allocated to one of the defined regions may be dynamically converted to a different defined region. In one embodiment, the dynamic conversion takes place when one of the defined regions does not have enough blocks remaining to support the write transaction. Accordingly, the conversion of blocks across the defined regions is supported in a dynamic manner.

As demonstrated in FIG. 4, following a write transaction (406), it is determined if there are enough blocks available in the wide striping region to support the write transaction (408). A negative response to the determination at step (408) is followed by a selection of blocks from the write affinity region for conversion to the wide striping region (410). In one embodiment, the blocks selected at step (410) are all at the same offset. The blocks selected at step (410) are freed from their write affinity designation (412) and are marked selected for the wide striping region (414). Once the marking is completed at step (414), the allocation map(s) is updated (416).

If at step (408) it is determined that there are enough blocks available in the wide striping region to support the write transaction, it is then determined if there are enough blocks available in the write affinity region to support the write transaction (418). A negative response to the determination at step (418) is followed by a selection of blocks from the wide striping region for conversion to the write affinity region (420). In one embodiment, the blocks selected for conversion at step (420) are all at the same offset. The blocks selected at step (420) are freed from their wide striping designation (422) and are marked selected for the write affinity region (424). Once the marking is completed at step (424), the allocation map(s) is updated (426). It is noted herein, that the order of block region availability determinations is not limited to the order described herein. In one embodiment, the availability determinations at steps (408) and (418) may be reversed. However, a positive response to the determinations at steps (408) and (418), is an indication that there is a sufficient quantity of allocated blocks in both regions to support the write transaction and at least one copy of the write transaction is written to each region (428) followed by an update of the allocation map(s) (430).

If there are no blocks available in either the write affinity type region or the wide striping type region, the write transaction will return with a "no space" error message. Similarly, if only one of the region types, i.e. write affinity or wide striping, does not have blocks available, a conversion takes place to supply the blocks necessary to complete the write transaction. Accordingly, as demonstrated herein, block allocation among the region types may be converted in real-time to support a write transaction when one of the regions does not have enough blocks available to support the transaction.

Figure 5:
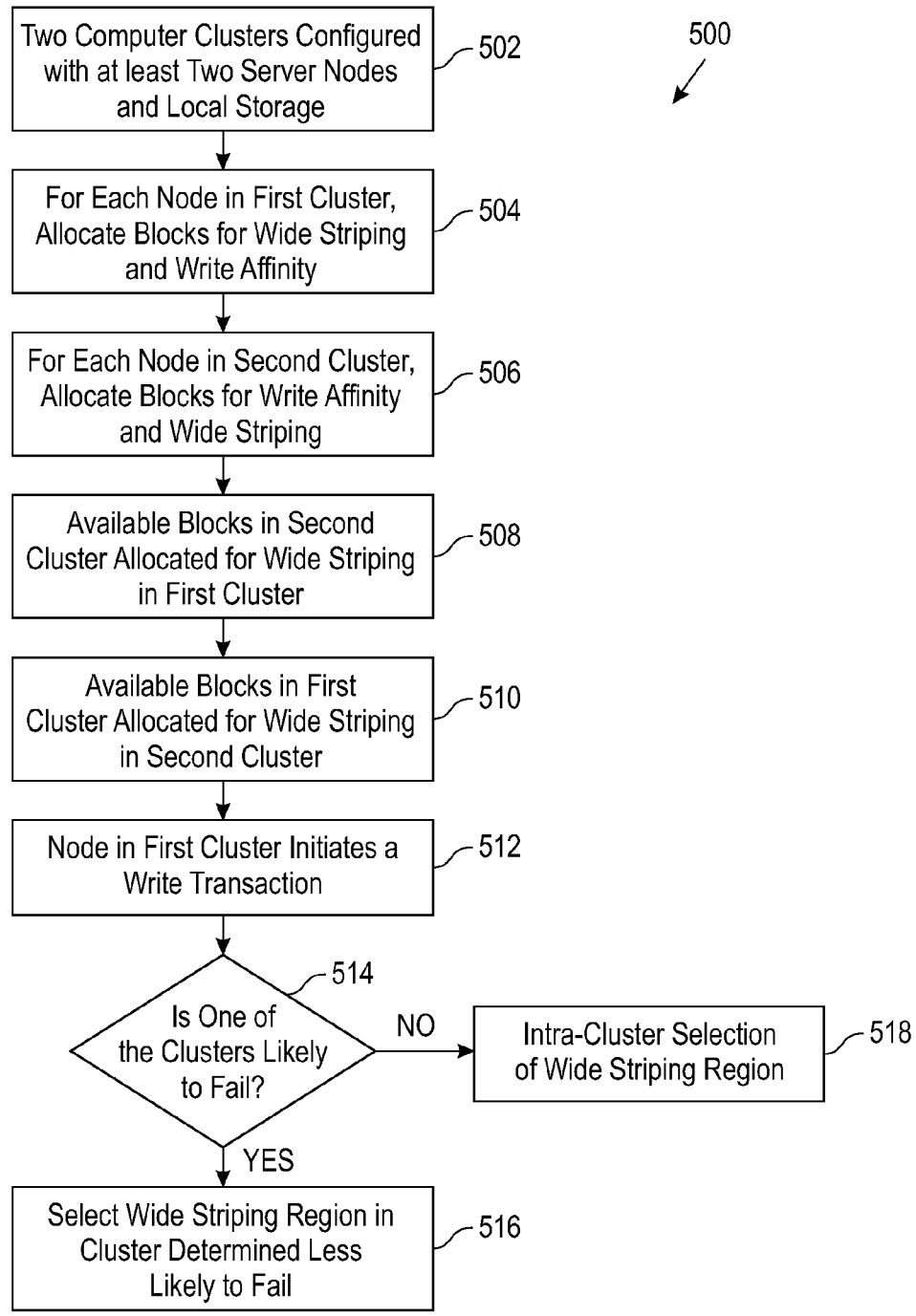
FIG. 5 is a flow chart illustrating a process for supporting write transactions in a multi-cluster configuration.

In one embodiment, there may be two or more clusters of server nodes, with each cluster having a designated file system with a defined quantity of blocks to support read and write transactions. FIG. 5 is a flow chart (500) illustrating a process for supporting write transactions in a multi-cluster configuration. Two computer clusters are provided with each cluster having at least two server nodes and storage media local to each server node (502). Blocks to support one or more write transactions are allocated to both a wide striping region and a write affinity region for each node in a first cluster (504). Similarly, blocks to support one or more write transactions are allocated to both a wide striping region and a write affinity region for each node in a second cluster (506). In one embodiment, the block allocation is performed separately for each cluster. At the same time, based upon the principles of wide striping, available blocks in the second cluster are allocated to support wide striping from the first cluster (508) and available blocks in the first cluster are allocated to support wide striping from the second cluster (510). More specifically, the allocation at steps (508) and (510) ensures that there is a cross-cluster allocation of blocks in the wide striping region. In one embodiment, each cluster may include two wide striping regions, one of the wide striping regions to support intra-cluster write transactions and one of the wide striping regions to support inter-cluster write transactions. Although only two clusters are described in the multi-cluster configuration, the invention should not be limited to a two cluster environment. In one embodiment, the multi-cluster configuration may include additional clusters.

Following the block allocations, the clusters are configured to support a write transaction. For example, in response to a first node in the first cluster initiating a write transaction (512), an algorithm is invoked to determine which wide striping region should be employed to write the second copy of the transaction. In a multi-cluster environment, it may be beneficial to write the wide striping copy of the transaction to a different cluster. More specifically, the algorithm determines if there is an indication that one of the clusters is likely to fail (514). In one embodiment, a positive response to the determination at step (514) is followed by determining which of the clusters has been determined likely to fail and selecting the wide striping region in the cluster determined less (or least) likely to fail (516). If the server node initiating the write transaction is owned by the cluster determined more likely to fail, then the wide striping region is selected on an inter-cluster basis. Conversely, if the server node initiating the write transaction is not owned by the cluster determined more likely to fail, then the wide striping region is selected on an intra-cluster basis. Similarly, a negative response to the determination at step (514) is followed by an intra-cluster selection of the wide striping region (518). In one embodiment and synonymous with the description provided in FIG. 5, nodes are separated into failure groups to mitigate multiple groups failing simultaneously.

The data is replicated once inside each failure group for reliability while optimizing performance. For example, in an embodiment with three replications of the data, a first copy is written in write affinity type region, a second copy is written inside one of the failure groups in a wide striping type region, and a third copy is written in a different failure group in a wide striping region. In one embodiment, other combinations of writing the data across the failure groups may be employed, and as such, the invention should not be limited to the combination provided in the above example. In an embodiment there are only two replications of the data, one copy may be written in a write affinity type region and a second copy may be written in a different cluster or the same cluster. Accordingly, the wide striping type region may be selected based upon a determined stability of the clusters in communication with the server node initiating the write transaction.

Figure 6:
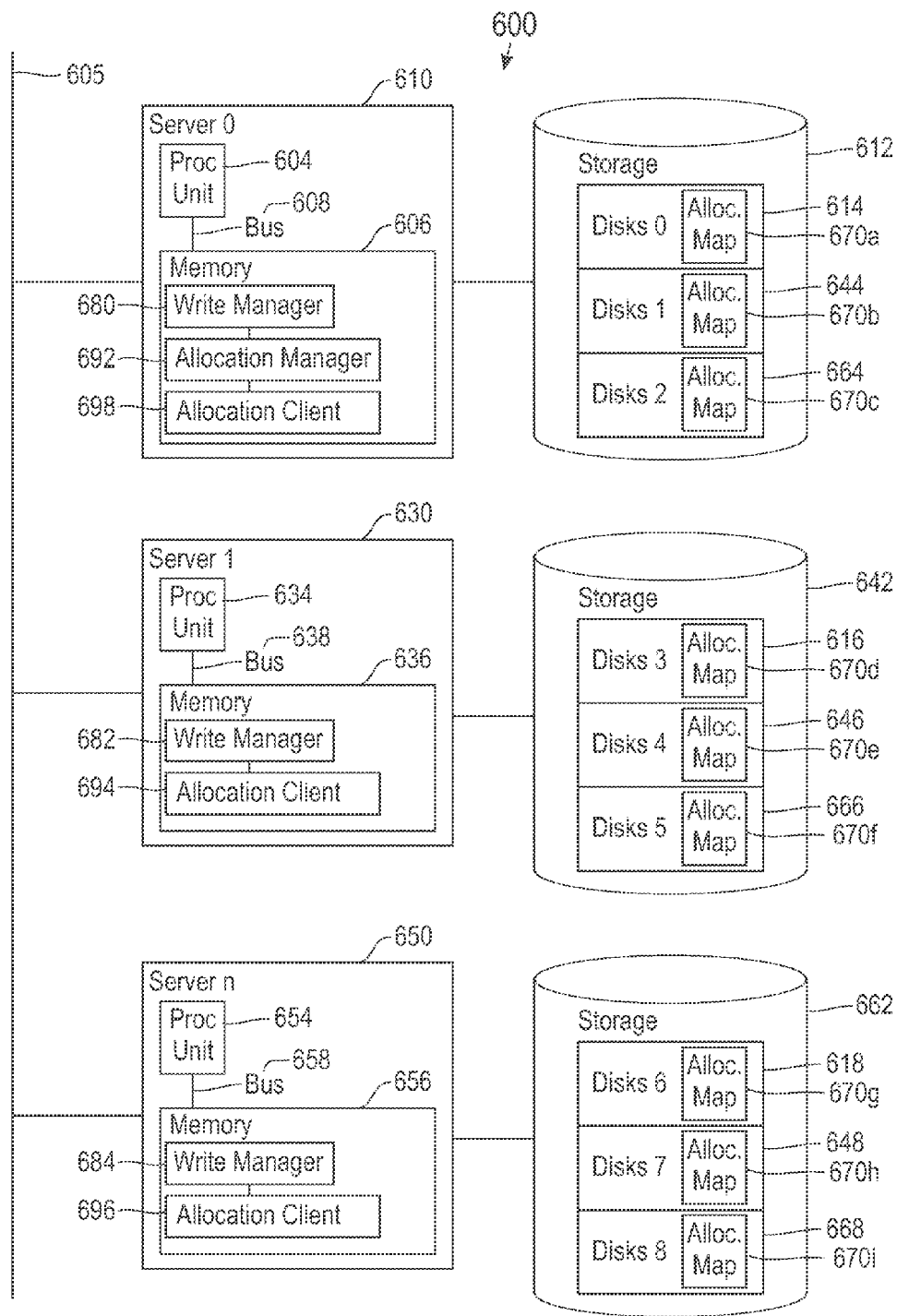
FIG. 6 is a block diagram of a computer system with tools to support a write transaction with a block allocation, according to the preferred embodiment of this invention, and is suggested for printing on the first page of the issued patent.

As demonstrated in the flow charts of FIGS. 1-5, a method is employed to support a write transaction to both the write affinity and wide striping regions of a file system. FIG. 6 is a block diagram (600) illustrating tools embedded in a computer system to support a write transaction to a defined region of the file system. More specifically, a clustered file system is shown mounted on multiple servers (610), (630), and (650). A clustered file system is a file system that is simultaneously mounted on multiple servers. Although three servers are shown in the example herein, the invention should not be limited to this quantity of servers in the clustered file system. Similarly, although only one cluster is shown herein, in one embodiment, there may be multiple clusters provided with cross-cluster communication supported over a network connection.

Each of the servers in the system is provided with local storage, and at the same time may communicate with remote storage within the cluster. More specifically, server (610) is provided with a processing unit (604), in communication with memory (606) across a bus (608) and in communication with data storage (612); server (630) is provided with a processing unit (634), in communication with memory (636) across a bus (638), in communication with data storage (642); and server (650) is provided with a processing unit (654), in communication with memory (656) across a bus (658), in communication with data storage (662). At the same time, server (610) may communicate with remote data storage (642) and (662) across a network connection (605), server (630) may communicate with remote data storage (612) and (662) across network connection (605), and server (650) may communicate with remote data storage (612) and (642) across network connection (605).

In the example shown herein, each of the data storage (612), (642), and (662) include a plurality of disks. More specifically, data storage (612) includes disks (614), (644), and (664), data storage (642) includes disks (616), (646), and (666), and data storage (662) includes disks (618), (648), and (668). Each of the disks is a part of the defined regions for block allocation to support a write transaction. The defined regions include a write affinity region and a wide striping region, with the write affinity region having blocks from data storage local to the respective node and the wide striping region having blocks from all data storage in the cluster. In other words, each disk in the cluster is a part of the regions containing blocks that are designated for write affinity and/or wide striping. Although only three disks are shown in the example to support each data storage, the invention should not be limited to the quantity shown herein. In one embodiment, each data storage may include a fewer quantity of disks or a larger quantity of disks.

An allocation map is provided for all data storage in the cluster. The allocation map is separated into multiple components, with each of the components placed on a different disk in data storage. As shown in the example herein, in one embodiment, the allocation map may be divided into nine components, and each disk gets one component. More specifically, for data storage (612) allocation map component (670*a*) is local to disk (614), allocation map component (670*b*) is local to disk (644), and allocation map component (670*c*) is local to disk (664); for data storage (642), allocation map component (670*d*) is local to disk (616), allocation map component (670*e*) is local to disk (646), and allocation map component (670*f*) is local to disk (666); for data storage (662), allocation map component (670*g*) is local to disk (618), allocation map component (670*h*) is local to disk (648), and allocation map component (670*i*) is local to disk (668). In one embodiment, the allocation map components may be further divided into separate components for wide striping and write affinity for each respective local disk.

An update of the allocation map includes one or more of the map components, depending on the extent of the replication. In one embodiment, the whole allocation map is not replicated to each disk. When a server node changes its component of the allocation map, the server node sends an update to the disk where the affected component of the allocation map is stored. In one embodiment, the disk where each allocation map component is located is part of the region metadata. As demonstrated in FIGS. 1 and 2 the allocation map includes two logical views of available storage blocks, including a first logical view to show storage space divided into wide striped regions and a second logical view to show storage space divided into write affinity regions. However, the allocation map should not be limited to the logical views of the available storage blocks as demonstrated above. In one embodiment, the allocation map may include an actual view of available storage blocks. Accordingly, the layout and provision of the allocation map provides vision of the data storage available to support a write transaction.

In addition to the allocation map, tools are provided to support the allocation of storage blocks for a write transaction. More specifically, a write manager is provided local to each server node, with each write manager configured to write a first copy of data to a free block designated in the write affinity region of the allocation map and to write a second copy of data to a free block designated in the wide striping region of the allocation map. As shown herein, server node (610) is provided with write manager (680), server node (630) is provided with write manager (682), and server node (650) is provided with write manager (684). As noted above, the block designations may be converted in a dynamic manner. More specifically, depending upon the specifics of the write transaction, there may be a need to convert blocks from wide striping to write affinity or from write affinity to wide striping.

To support the dynamic conversion, an allocation manager is provided in one node in a cluster. In the example shown herein, server node (610) is provided with an allocation manager (692). The allocation manager (692) is provided to dynamically convert at least one block in the defined region types to support the write transaction in response to one of the regions running out of available blocks. More specifically, the conversion of data blocks by the allocation manager (692) includes conversion of blocks designated for write affinity to wide striping and conversion of blocks designated for wide striping to write affinity. Accordingly, the allocation manager (692) functions to ensure that there is a sufficient block allocation to support a write transaction.

As noted above, the allocation map is comprised of multiple allocation map components, with at least one allocation map component local to data storage of each server node. An allocation client is provided local to each server node to support the block allocation for a write transaction. More specifically, the allocation client for a server initiating a write transaction acquires ownership of regions from the allocation manager (692), and performs a block allocation with the acquired regions. Following the block allocation, the allocation client updates the allocation map on disk. As shown herein, server (610) is provided with allocation manager (692) in communication with allocation client (698) to update an allocation map component (670a) to support a write transaction or to support conversion of blocks from one region type to another region type in any data storage in the system. Similarly, server (630) is provided with allocation client (694) in communication with the allocation manager (692) across the network (605), and server (650) is provided with allocation client (696) in communication with the allocation manager (692) across the network (605). In one embodiment, the allocation map portion for any data allocation may or may not be local to a given server node.

The components shown and demonstrated herein for a single cluster configuration may be extrapolated across each cluster in the network. In a multi-cluster configuration, a tool is employed to select one of the clusters to write the second copy of data. For example, if one of the clusters in the network has characteristics that exhibit likelihood to fail, the tool may select a different cluster to write the second copy of data. Selection of available data blocks takes into consideration metadata transactions and likelihood of failure of a cluster. By writing a copy of data to both wide striping and write affinity region, the quantity of metadata transactions across the network is mitigated. At the same time, by writing data to the wide striping region of a more stable cluster ensures likelihood of access and availability of the data.

As identified above, the write managers (680), (682), and (684), allocation manager (692), and allocation clients (694) and (696) function to manage availability of blocks to support a write transaction which creates two copies of the data, one copy based upon the properties of write affinity and a second copy based upon the properties of wide striping. The managers and clients are shown residing in memory local to the server. More specifically, write manager (680), allocation manager (692), and allocation client (698) each reside in memory (606) of server (610). Write manager (682) and allocation client (694) each reside in memory (636) of server (630), and write manager (684) and allocation client (696) each reside in memory (656) of server (650). Although in one embodiment, the write managers, allocation manager, and allocation clients may reside as hardware tools external to memory of their respective server, or they may be implemented as a combination of hardware and software. Similarly, in one embodiment, the managers and clients may be combined into a single functional item that incorporates the functionality of the separate items. As shown herein, each of the manager(s) and clients are shown local to the respective servers. However, in one embodiment they may be collectively or individually distributed across the network and function as a unit to manage block allocation and designation to support a write transaction. Accordingly, the managers and clients may be implemented as software tools, hardware tools, or a combination of software and hardware tools, to collect and organize data content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
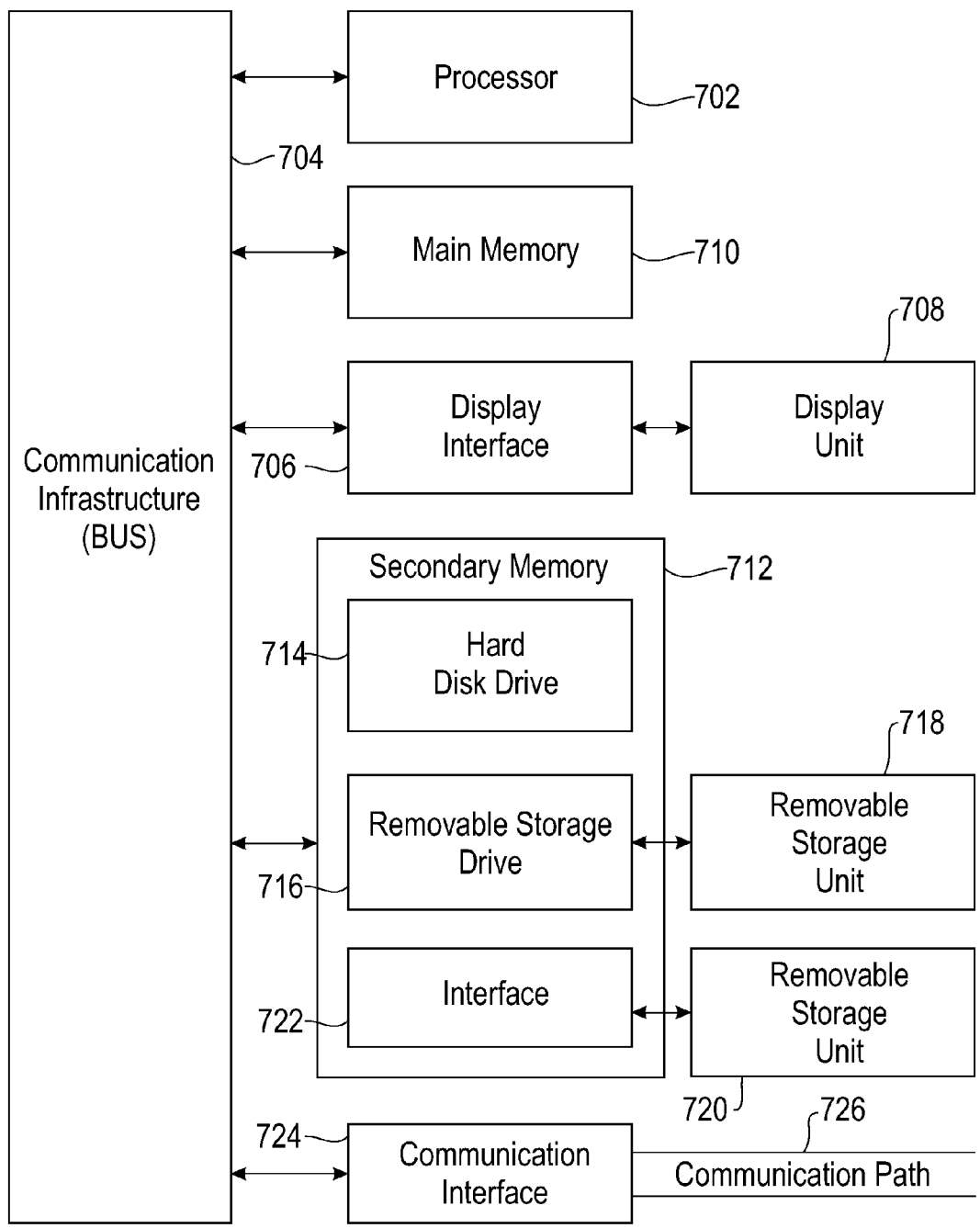
FIG. 7 is a block diagram showing a system for implementing an embodiment of the present invention

Referring now to FIG. 7 is a block diagram showing system for implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured with more than just wide striping and write affinity type regions. Region types can be provided that contain disks from any permutation of nodes, and not limited to local or every disk in the system. Similarly, depending on the number of copies and the nature of the copies, the amount of blocks in the regions may change. In one embodiment, only a subset of nodes could be performing the data allocation in the system, i.e. acquiring the regions and allocating blocks. The remaining writers in the system that are not performing data allocation can ship their allocation requests to these subset of nodes. Accordingly, the scope of protection of this invention is limited only by the following claims and their equivalents.

We claim:

1. A method, comprising:
    defining at least two types of regions for block allocation in a cluster file system, the defined regions comprise a write affinity region and a wide striping region, wherein each server node in the cluster has a first storage portion associated with the write affinity region of the file system for storing data blocks local to a server node and a second storage portion associated with the wide striping region of the file system for storing data blocks from other server nodes in the cluster;
    maintaining an allocation map for all data storage space in the cluster file system, the allocation map having two views, a first view showing the storage space divided into wide striped regions and a second logical view showing the storage space divided into write affinity regions;
    for allocating storage blocks for a write transaction, a node acquiring ownership of a write affinity region and a wide striping region, and the node writing a first copy of data to a free block from the acquired write affinity region and a second copy of data to a free block in the acquired wide striping region; and
    converting at least one block from one of the defined regions to another of the defined regions to support the write transaction in response to all of the regions of one of the defined types running out of available blocks, wherein the conversion is selected from the group consisting of: converting the write affinity region to the wide striped region, and converting the wide striped region to the write affinity region.

2. The method of claim 1, further comprising updating the allocation map responsive to converting the at least one block from one of the defined regions.

3. The method of claim 1, further comprising in a multi-cluster configuration invoking an algorithm to select one of the clusters for writing the second copy of data, including writing the second copy of data to a cluster determined less likely to fail.

4. The method of claim 1, wherein writing a first copy of data to the write affinity region and the second copy to the wide striping region mitigates metadata transactions across a network.

5. The method of claim 1, further comprising maintaining multiple allocation maps for system disk space, including a first allocation map for the wide striping region and a second allocation map for the write affinity region.

6. The method of claim 1, wherein network traffic is reduced by writing data to the write affinity region and using available bandwidth is required for writing data to the wide striped region.

7. A system comprising:
    a cluster file system having local data storage and in communication with remote data storage;
    data storage having defined at least two types of regions for block allocation, the at least two region types including a write affinity region and a wide striping region, each server node in the cluster has a first storage portion associated with the write affinity region for storing data blocks local to a server node in the cluster and a second storage portion associated with the wide striping region for storing data blocks from other server nodes in the cluster;
    an allocation map for all data storage space in the cluster, the allocation map having two views, a first view to show storage space divided into wide striped regions and a second view to show storage space divided into write affinity regions;
    for allocating storage blocks for each write transaction, a write manager of a write node to acquire ownership of at least one write affinity region and at least one wide striping region, the write manager to write a first copy of data to a free block from the acquired write affinity region and to write a second copy of data to a free block in the acquired wide striping region; and
    an allocation manager in communication with the write manager, the allocation manager to convert at least one block in one the defined regions to another of the defined regions to support the write transaction in response to all of the regions of one of the defined types running out of available blocks, wherein the conversion is selected from the group consisting of: converting the write affinity region to the wide striped region, and converting the wide striped region to the write affinity region.

8. The system of claim 7, further comprising an allocation client in communication with the allocation manager, the allocation client to update the allocation map in response to conversion of the at least one block from one of the defined regions.

9. The system of claim 7, further comprising in a multi-cluster configuration, an algorithm to select one of the clusters to write the second copy of data, including a write of the second copy of data to a cluster determined less likely to fail.

10. The system of claim 7, wherein the write of the first copy of data to a free block from the write affinity region and a second copy of data to a free block in the wide striping region mitigates metadata transactions across a network.

11. The system of claim 7, further comprising multiple allocation maps for system disk space, including a first allocation map for the wide striping region and a second allocation map for the write affinity region.

12. A computer program product, the computer program product comprising a non-transitory computer readable data storage device having computer readable program code embodied therewith, the computer readable program code comprising:
   computer readable program code configured to define at least two types of regions in a cluster file system for block allocation, at least two types of regions including a write affinity region and a wide striping region, wherein each server node in the cluster has a first storage portion associated with the write affinity region of the file system for storing data blocks local to a server node in the cluster and a second storage portion associated with the wide striping region of the file system for storing data blocks from other server nodes in the cluster;
   computer readable program code configured to maintain an allocation map for all data storage space in the cluster, the allocation map having two views, a first view to show the storage space divided into wide striped regions and a second view to show the storage space divided into write affinity regions;
   computer readable program code configured to acquire ownership of at least one write affinity region and at least one wide striping region and to write a first copy of data to a free block from the acquired write affinity region and a second copy of data to a free block in the acquired wide striping region for allocating storage blocks for each write transaction; and
   computer readable program code configured to convert at least one block in one of the defined regions to another of the defined regions to support the write transaction in response to all of the regions of one of the defined types running out of available blocks, wherein the conversion is selected from the group consisting of: converting the write affinity region to the wide striped region, and converting the wide striped region to the write affinity region.

13. The computer program product of claim 12, further comprising instructions to update the allocation map in response to conversion of at least one block from one of the defined regions.

14. The computer program product of claim 12, further comprising instructions to invoke an algorithm to select one of the clusters for writing the second copy of data in a multi-cluster configuration, including a write of the second copy of data to a cluster determined less likely to fail.

15. The computer program product of claim 12, wherein the instructions to write a first copy of data to the write affinity region and the second copy of data to the wide striping region mitigates a quantity of metadata transactions across a network.

16. The computer program product of claim 12, further comprising instructions to maintain multiple allocation maps for system disk space, the allocation maps including a first allocation map for the wide striping region and a second allocation map for the write affinity region.

17. A method, comprising:
   a file system having at least two types of regions for block allocation, the defined regions including a write affinity region and a wide striping region, wherein each server node in the cluster has a first storage portion associate with the write affinity region of the file system for storing data blocks local to a server node in the cluster and a second storage portion associate with the wide striping region of the file system for storing data blocks from other server nodes in the cluster;
   maintaining at least two views of an allocation map for all data storage space in the file system, a first logical view showing the storage space divided into wide striped regions and a second logical view showing the storage space divided into write affinity regions;
   for allocating storage blocks for each write transaction, acquiring ownership of a write affinity region and a wide striping region, and writing a first copy of data to a free block from the acquired write affinity region and a second copy of data to a free block in the acquired wide striping region; and
   converting at least one block from one of the defined regions to another of the defined regions to support the write transaction if all of the regions of one of the defined types cannot support the write transaction, wherein the conversion is selected from the group consisting of: converting the write affinity region to the wide striped region, and converting the wide striped region to the write affinity region.

18. The method of claim 17, further comprising updating the allocation map responsive to converting the at least one block from one of the defined regions.

* * * * *